United States Patent [19]

Allread

[11] 4,269,226
[45] May 26, 1981

[54] UNIVERSAL BREAKAWAY COUPLING

[75] Inventor: Alan R. Allread, Jackson, Mich.

[73] Assignee: Aeroquip Corporation, Jackson, Mich.

[21] Appl. No.: 104,659

[22] Filed: Dec. 17, 1979

[51] Int. Cl.³ .................. F16L 37/28; F16L 37/18
[52] U.S. Cl. ........................... 137/614; 285/1; 285/316; 137/614.05; 251/149.6
[58] Field of Search .................. 285/1, 33, 277, 316; 137/614, 614.01, 614.02, 614.03, 614.04, 614.05; 251/149.6, 149.8

[56] References Cited
U.S. PATENT DOCUMENTS

| | | | |
|---|---|---|---|
| 2,463,326 | 3/1949 | Simsko et al. | 137/614.03 |
| 2,765,652 | 4/1955 | Kaiser | 285/35 |
| 3,201,147 | 8/1965 | DeCenzo | 285/1 |
| 3,383,122 | 5/1968 | Richardson | 285/1 |
| 3,420,497 | 1/1969 | Wilcox | 285/316 |
| 3,537,478 | 11/1970 | Evans | 285/1 |
| 3,549,175 | 12/1970 | Evans | 285/1 |
| 3,567,255 | 3/1971 | Evans | 285/1 |
| 3,670,770 | 6/1972 | Nelson | 137/614.02 |

Primary Examiner—Martin P. Schwadron
Assistant Examiner—A. Michael Chambers
Attorney, Agent, or Firm—Beaman & Beaman

[57] ABSTRACT

A breakaway coupling for fluid systems wherein interconnected coupling parts will separate upon predetermined bending or tension forces being applied to the respective parts. A bending or tension force appllied to one part axially misaligned with respect to the other part produces a pivotal movement which automatically releases the coupling connection means permitting the parts to separate without damage. Additionally, the coupling incorporates automatic release structure sensing coaxial tension forces permitting uncoupling without relative pivoting.

11 Claims, 4 Drawing Figures

UNIVERSAL BREAKAWAY COUPLING

BACKGROUND OF THE INVENTION

Breakaway fluid couplings are commonly employed in fluid systems wherein it is desired to disconnect fluid couplings in response to tension forces within the hose or piping associated with the couplings. For instance, breakaway couplings are commonly employed with agricultural implements wherein hydraulically operated implements are connected to tractors through impact releasable hitches whereby release of the hitch, and tensioning of the hydraulic hose, does not cause hose rupture, but permits the couplings to separate without damage to the conduit system. Examples of such apparatus are shown in the assignee's U.S. Pat. Nos. 2,463,326 and 2,705,652.

While previous breakaway fluid couplings would permit the couplings parts to separate upon predetermined axial forces being applied to the parts, prior devices are not reliable if the forces applied to the coupling parts are not substantially coaxial, and angularly misaligned forces on the parts tending to bend or pivot one part relative to the other will not permit reliable coupling separation and may result in hose rupture or damage to the coupling parts.

It is an object of the invention to provide a breakaway fluid coupling which will dependably operate under both coaxial and non-coaxial tension forces being applied to the coupling parts.

A further object of the invention is to provide a breakaway fluid coupling wherein the construction of the coupling permits limited pivotal or swivel movement between the coupling parts without damage or adversely affecting the seal therebetween, and wherein such pivoting to a predetermined extent automatically releases the coupling parts from each other.

A further object of the invention is to provide a fluid coupling having relatively pivotal interconnected parts wherein uncoupling is automatically achieved upon a predetermined pivotal displacement occurring therebetween.

Yet another object of the invention is to provide a breakaway fluid coupling having relatively pivotal parts wherein release results from either an excessive pivotal displacement between the parts occuring, or excessive tension forces are applied to the parts in a substantially coaxial direction.

In the practice of the invention the male coupling part includes a projection having an exteriorly defined spherical segment surface for establishing a sealed relationship to a spherically segmented recess defined in the female member. Additionally, the male projection includes a spherical segment locking surface concentric to the sealing surface engaged by radially movable detents mounted upon the female member. Such arrangement permits limited relative pivotal movement between the coupling parts while maintaining a sealed relationship.

The female part includes an annular locking sleeve axially slidable thereon between locking and release positions regulating the radial location of the detents. An abutment defined on the male member engages the sleeve upon a predetermined pivotal displacement occurring between the coupling parts which axially shifts the sleeve upon the female member from the locking position to the release position uncoupling the parts.

Biasing means mounted on the male member impose an equally distributed axial force on the female member tending to maintain a coaxial relationship between the coupling parts, and relative pivoting of the parts is resisted by this biasing means.

The female member also includes a conduit attachment body axially displaceable upon the female member which is spring biased in the direction opposite to that in which conduit tension forces would be applied thereto. Lost motion connection means interposed between the female conduit attachment member and the locking sleeve permit the sleeve to function as aforedescribed, and also causes the sleeve to be displaced from the locking position to the release position upon sufficient coaxial tension forces being applied to the conduit attachment means. Accordingly, the latch sleeve is automatically displaceable under dual conditions, i.e. excessive relative coupling part pivoting or excessive axial tensioning.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
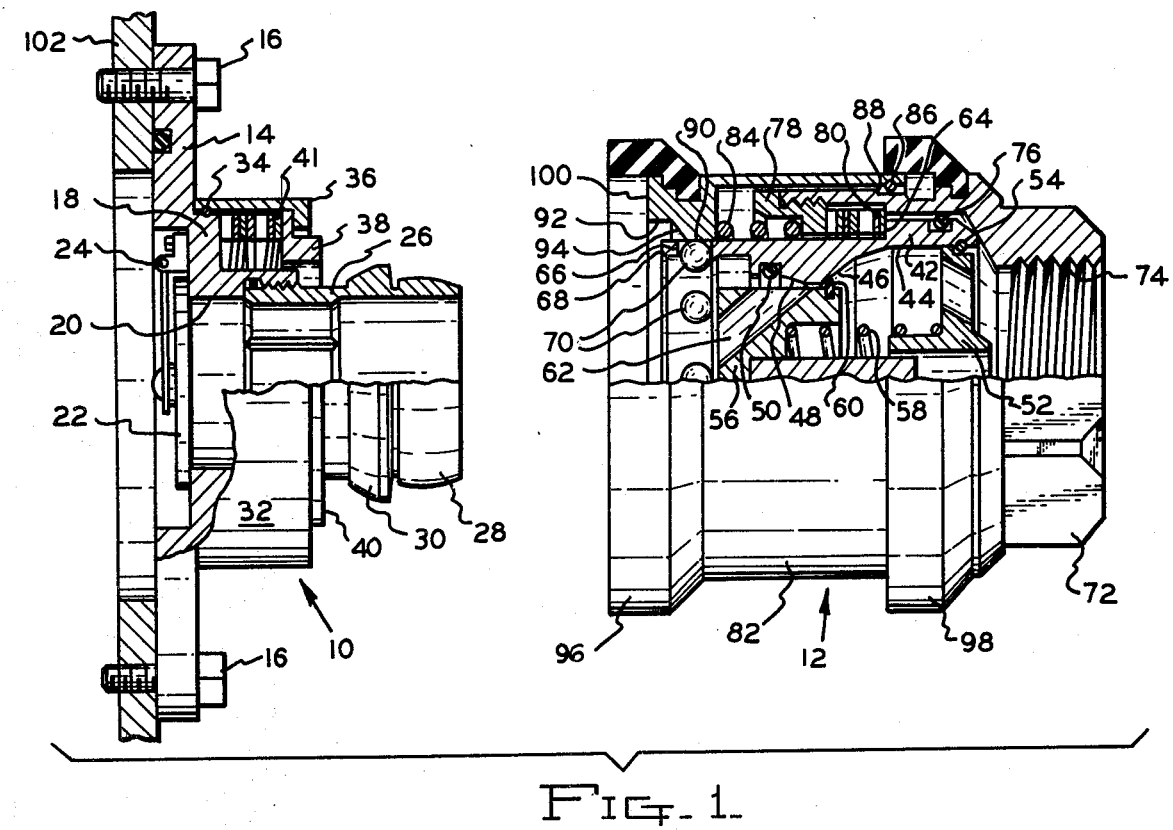
FIG. 1 is an elevational view, partially diametrically sectioned, illustrating the coupling parts in an uncoupled condition.

A breakaway coupling in accord with the invention may be employed in a variety of applications, such as with agricultural systems, aircraft fueling, or the like. The embodiment disclosed was specifically designed for defueling aircraft wherein a tanker truck is connected to an aircraft fuel tank outlet for removing fuel therefrom, and as a safety precaution, it is desired that in the event of fire or other emergency the tanker truck could be driven away from the aircraft without manually disconnecting the hose line, and the hose line will automatically uncouple upon a predetermined tension existing therein, or a predetermined angle existing between the coupling parts.

In most applications it is desirable that the coupling parts be of the self sealing type having valve structures associated therewith wherein such valve structure closes the coupling parts passages when the coupling parts are disconnected, and the part valves will automatically open upon complete coupling occurring. However, it is to be understood that a variety of types of valves can be used with couplings incorporating the inventive concepts, and it is also possible to use couplings in accord with the invention where valves are not directly associated with the coupling parts, even though valve structure may be located within the conduit systems associated with the coupling parts.

In the disclosed embodiment the coupling consists of a male part 10 and a female part 12. The male member 10 is formed with a flange 14 having bolt receiving holes therein whereby the male member may be attached to the wall of a tank or reservoir by bolts 16. The female coupling part 12 is normally associated with a hose or other flexible conduit, and in the following description and accompanying claims the flange and hose associated components of the coupling parts are generically referred to as conduit system attachment means.

Figure 2:
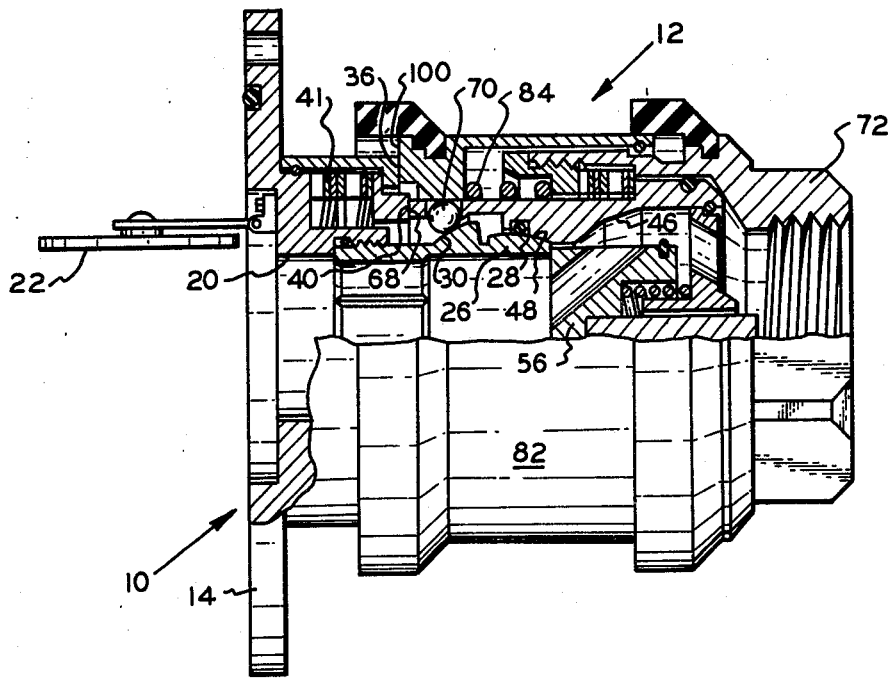
FIG. 2 is an elevational view, partially diametrically sectioned, illustrating the coupling parts in a coupled condition and coaxially aligned.

The male coupling part 10 includes a tubular member body 18 upon which the flange 14 is defined, and a passage 20 formed in the body constitutes a fluid passage wherein fluid flow therethrough is controlled by a gravity operated check valve 22 pivotally connected to the body at 24 for pivotal motion between the illustrated closed condition, FIG. 1, and a open condition, FIG. 2.

A tubular projection 26 is threadedly affixed to the body 18 and includes an axial passage coaxial with passage 20 whereby unrestricted fluid flow through the male coupling is possible as the fluid flows toward the left, FIG. 2.

The projection 26 is provided with a spherical segment sealing surface 28, and a spherical segment locking surface 30, both of the spherical surfaces having the same center lying upon the axis of the projection 26.

The male part 10 also includes an abutment member 32 of annular configuration affixed thereto by drive wire 34, and the abutment member includes a radial abutment surface 36 which radially extends over a biasing ring 38 of annular form including an exposed circular end 40. The biasing ring 38 is biased to the right into engagement with the abutment member 32 by a plurality of annular spring washers 41, such as Belleville washers, and the washers 41 permit the ring to be displaced to the left upon body 18 as will be later described.

The female coupling part 12 includes an annular body 42 having a passage 44 defined therein. The passage includes a valve seat 46, and a spherical segment surface recess 48 which includes a recess in which O-ring 50 is mounted. A spider 52 is mounted within the passage 44 by drive wire 54 and valve 56 is axially positionable upon the spider under the influence of compression spring 58 whereby in the closed condition the valve sealing ring 60 will engage valve seat 46, FIG. 1, while in the open position the valve port 62 communicates with passage 20 permitting flow through body 42.

The body 42 includes a radial shoulder 64 and a plurality of detent receiving holes 66 are circumferentially defined in the body adjacent the nose end 68. Each of the holes 66 receives a ball detent 70, and the configuration of the holes 66 is such to prevent the balls from excessive radial movement within the holes toward the body axis in the known manner.

A conduit system attachment member 72 of annular construction is mounted upon the body 42 for selective axial displacement thereto. The member 72 is internally threaded at 74 whereby a hose or conduit fitting, not shown, may be attached thereto for establishing communication with the coupling part 12, and the member includes a cylindrical surface for establishing a sealed relationship with the body O-ring 76. The member 72 is also internally threaded for receiving the threaded collar 78, and a plurality of spring washers 80, such as wave washers or Belleville washers, are located in the recess defined between the collar 78 and the body shoulder 64. The spring washers 80 thereby impose a biasing force on the member 72 to the left, as viewed in FIG. 1.

The annular locking or latch sleeve 82 circumscribes coupling part 12, as illustrated, and is axially slidably mounted upon the member 72. An annular compression spring 84 interposed between the collar 78 and the sleeve biases the sleeve toward the left, FIG. 1, and such axial movement is limited by engagement of the sleeve drive wire 86 with the member shoulder 88. The sleeve 82 is also formed with a cylindrical detent retaining surface 90 intersected by an annular recess 92 which includes conical surface 94, the recess providing clearance for the detent balls 70, as later described. Annular rubber bumpers 96 and 98 mounted upon the sleeve 82 and member 72, respectively, protect the coupling part 12 when dropped or lying on the ground, and the sleeve radial end 100 constitutes a release actuating surface as later described.

In use, the male member 10 may be bolted to the tank reservoir 102 of a tanker truck and the valve 22 will normally be in the lower or closed condition sealing the passage 20 with respect to the tank interior. The coupling part 12 may be located upon the end of a defueling hose, not shown, and when it is desired to connect the part 12 to the male part 10 the operator manually axially shifts the sleeve 82 to the right, FIG. 1, to align the ball detents 70 with the recess 92 permitting the balls to ride over the maximum diameter of the surface 30 as the projection 26 enters the recess 48. After the detent balls 70 are in axial alignment with the surface 30 the sleeve 82 is released against the biasing force of spring 84 and surface 94 will force the balls into engagement with the surface 30 wherein the cylindrical surface 90 will lock the ball detents 70 against surface 30 as shown in FIG. 2. In this condition the coupling parts are fully connected, and as the part 12 was being inserted upon the part 10 the outer end of projection 26 was engaging the valve 56 wherein the valve is now positioned to unseat ring 60 from seat 46 provided unrestricted flow between passages 20 and 44. As will be noted in FIG. 2, the body end 68 engages the ring 38, and the sleeve end surface 100 is in engagement with the radial abutment surface 36. Upon a vacuum being created within the tank 102 fuel will flow through the coupling opening the valve 22 as shown in FIG. 2.

The firm engagement of the body end 68 with the ring 38 will produce axial force on the body 12 tending to maintain the axis of part 12 coaxial with the axis of part 10. Thus, the normal orientation between the coupling parts will be substantially coaxial as shown in FIG. 2.

Figure 3:
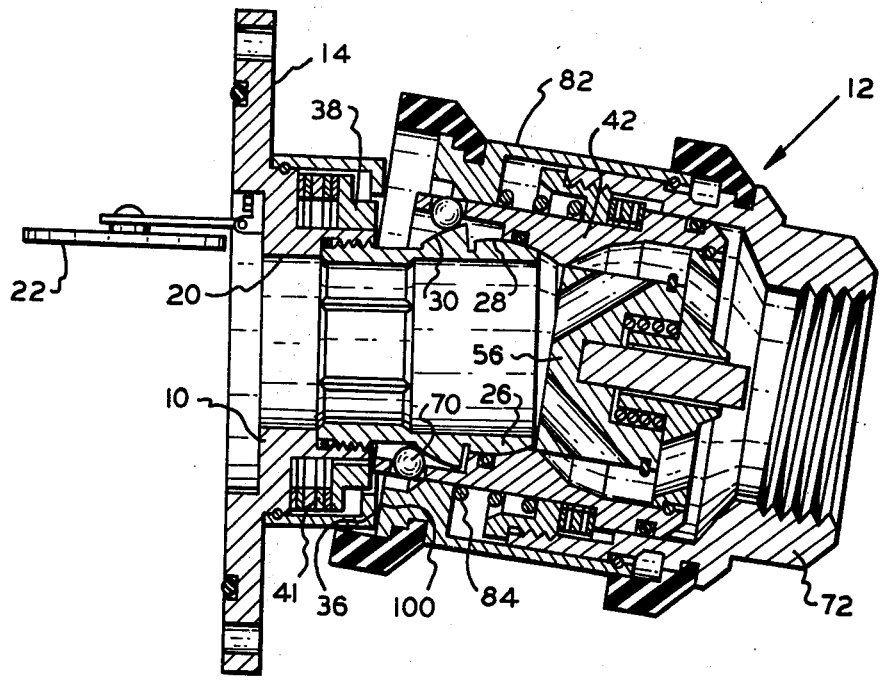
FIG. 3 is an elevational, diametrically sectioned view illustrating the coupling parts relatively pivoted to each other upon the detents being released, and prior to separation of the parts.
Figure 4:
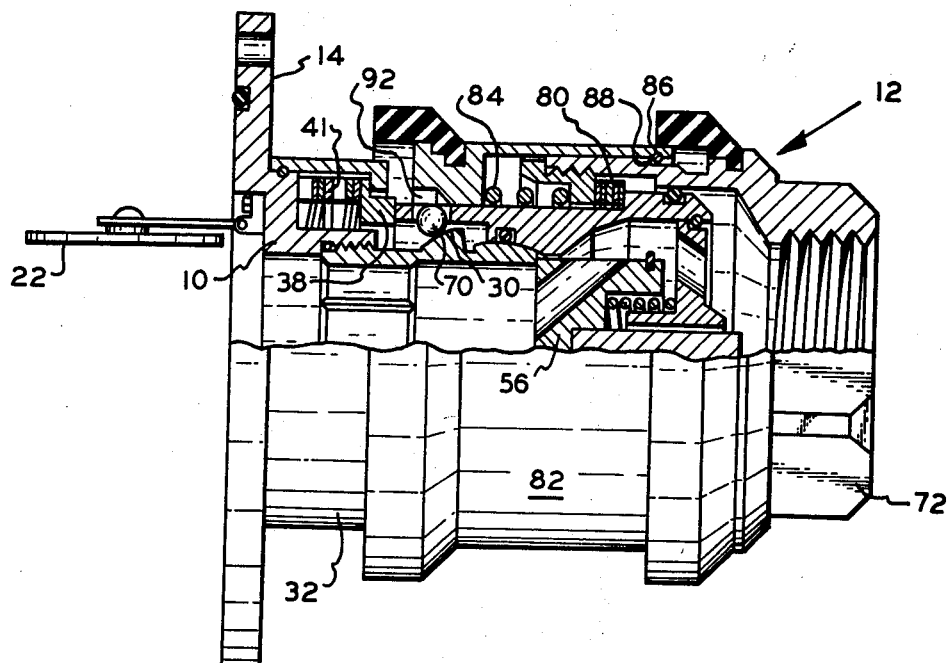
FIG. 4 is an elevational, partially diametrically sectioned view illustrating the coupling parts when under coaxial tension upon release of the detents and prior to separation of the parts.

In the event of the an emergency, or should the user neglect to manually disconnect the coupling parts after use by displacing the sleeve 82 to the right to align ball detents 70 with recess 92, the movement of the truck upon which coupling part 10 is mounted will usually produce an angular misalignment between the axes of parts 10 and 12 as the conduit attached to part 12 is tensioned. Such a bending or swivel force imposed upon the part 12 will cause the part 12 to pivot relative to part 10 about the center of the spherical surfaces 28 and 30. As surface 30 is concentric with the pivot center the ball detents will permit such a pivoting action, and the resistance to such pivoting action is only produced by the ring 38 bearing upon the end 68 of body 42. However, as the tension in the hose increases the ring 38 will be shifted to the left by nose end 68 as shown in FIG. 3 compressing spring washers 41. Simultaneously with the inward movement of the ring 38, the abutment surface 32 will be engaging the "lower" portion of the sleeve end 100 causing the sleeve 82 to be displaced to the right on member 72. Thus, the pivoting of the part 12 on part 10 causes an axial displacement of the sleeve 82, and upon the sleeve recess 92 aligning with the detents 70, the detents will be released from the surface 30 permitting the detents to pass over the maximum diameter of projection 26 releasing the coupling part 12 from part 10. Upon such release the valve 56 will close to the condition shown in FIG. 1, and the valve 22 will also close.

Accordingly, it will be appreciated that release of the coupling parts 10 and 12 may be solely achieved by the relative pivoting of the coupling parts as resisted by the biasing forces imposed by spring washers 41, and sleeve spring 84.

In the event that the tension forces within the hose associated with part 12 are coaxial with respect to the coupling axes, or substantially so, little or no pivoting of part 12 relative to part 10 will occur. However, as the tension forces within the hose increase the spring washers 80 will compress permitting the member 72 to shift to the right relative to the body 42, and this action causes the shoulder 88 to engage the drive wire 86 and shift the sleeve 82 to the right relative to the body 42. Upon such shifting aligning the recess 92 with the ball detents 70 the detents will be released from the surface 30 permitting the part 12 to release from part 10. In this event it is the movement of the sleeve 82 created by the compression of the spring washers 80 which provides the releasing action of the sleeve.

In practice, assuming the operator has not manually disconnected the coupling parts, and proceeds to drive the tank truck away from the aircraft being defueled, the tension forces within the hose would normally produce both a pivoting of the part 12 relative to part 10, and compression of the spring washers 80, and both the pivoting and tension forces will, in combination, produce the necessary sleeve motion to release the ball detents. The rapid release of the coupling part 12 permits the coupling part to fall to the ground as protected by the elastomer bumpers, and no damage is incurred by the coupling parts, which may be used repeatedly regardless of the type or number of uncoupling operations.

The shoulder 88 and drive wire 86 constitute a lost motion connection of the sleeve 82 with the member 72, and this lost motion connection permits the dual operation of the sleeve without interference regardless of whether it is a pivoting or tension force acting upon the sleeve. The aforedescribed structure results in a very dependable coupling operation capable of functioning under emergency conditions.

It is appreciated that various modifications to the inventive concepts may be apparent to those skilled in the art without departing from the spirit and scope of the invention.

I claim:

1. A breakaway fluid coupling characterized by its ability to operate under angular misalignment conditions in all directions relative to an axis, comprising, in combination, male and female coupling parts each defining a fluid passage coincident with said axis when coupled and each including conduit system attachment means, an axially extending annular projection defined on said male coupling part defining a portion of said male part passage, an exterior spherical sealing surface concentrically defined on said projection, an inner spherical surface recess defined in said female coupling part sealingly receiving said projection spherical surface permitting pivoting of said coupling parts relative to each other, connectable first and second locking means defined upon one of said coupling parts, one of said locking means being shiftable upon said one of said parts between locking and release positions, the other of said locking means comprising a plurality of detents radially movable upon their associated part between locking and release positions as determined by the position of said the other locking means, and operating means defined upon one of said parts shifting said one locking means from its locking position to its release position upon the axial misalignment of said coupling parts due to relative pivoting exceeding a predetermined angular extent.

2. In a breakaway fluid coupling as in claim 1, said one locking means being axially displaceable upon its associated coupling part, and said operating means including axially displaceable means and fixed abutment means defined on the other coupling part engaging said part upon which said shiftable locking means is defined and said shiftable locking means, respectively, upon said parts being connected.

3. In a breakaway fluid coupling as in claim 1, tension releasing means defined on said part supporting said shiftable locking means and operatively connected to said shiftable locking means shifting said locking means to said release position upon predetermined tension forces being imposed on said coupling parts in an axial direction regardless of said coupling parts relative pivotal and axial orientation.

4. In a breakaway fluid coupling as in claim 3, said tension releasing means including axially shiftable conduit system attachment means defined upon said part supporting said shiftable locking means, lost motion means interposed between said conduit attachment means and said shiftable locking means permitting limited axial displacement of said conduit attachment means relative to said locking means, and compression spring means interposed between said shiftable attachment means and its associated coupling part resisting displacement of said conduit attachment means relative to said associated coupling part under axial tension forces.

5. A breakaway fluid coupling characterized by its ability to operate under misalignment conditions comprising, in combination, male and female coupling parts each defining a fluid passage having an axis and each including conduit system attachment means, an axially extending annular projection defined on said male coupling part defining a portion of said male part passage, an exterior spherical sealing surface concentrically defined on said projection, an inner spherical surface recess defined in said female coupling part sealingly receiving said projection spherical surface permitting pivoting of said coupling parts relative to each other, an annular substantially spherical locking surface defined on said projection concentric with spherical sealing surface, an annular locking sleeve mounted upon said female coupling part for axial displacement thereon between coupling locking and release positions, spring means defined upon said female part biasing said sleeve toward said locking position, a plurality of radially displaceable detents mounted on said female part in a axially fixed location, said locking sleeve radially displacing said detents toward said female part axis at said locking position, said detents engaging said locking surface during connection of said parts to maintain assembly of said parts and said locking and sealing surfaces permitting relative part pivoting about the center of said spherical surfaces, and abutment means defined on said male part radially spaced from its associated axis adapted to be engaged by said locking sleeve upon a predetermined degree of pivoting occurring between said parts axially shifting said sleeve from said locking position to said release position to uncouple said parts.

6. In a breakaway fluid coupling as in claim 5 wherein said sleeve circumscribes said female part and said abutment means is of an annular configuration concentric to said male part axis.

7. In a breakaway fluid coupling as in claim 5, biasing means defined upon said male part radially spaced from said axis thereof exerting a substantially uniform axial biasing force on said female part at equal radial locations thereon tending to maintain a coaxial relationship between said parts' axes.

8. In a breakaway fluid coupling as in claim 7, said biasing means including an annular ring defined on said male part concentric to the axis thereof, and annular spring means axially biasing said ring in the direction of said projection.

9. In a breakaway fluid coupling as in claim 5, said female part further including a tubular body in which said recess is defined and a tubular conduit system attachment member slidably mounted on said body for axial displacement thereon between sleeve locking and release positions, lost motion connection means connecting said sleeve and said member permitting limited axial movement of said sleeve between locking and release positions under the influence of said abutment means and movement of said sleeve between locking and release positions due to axial tension forces applied to said member, and biasing means interposed between said female body and said member biasing said member in the axial locking direction of said sleeve.

10. In a breakaway fluid coupling as in claim 5, a valve means affixed to each of said parts adapted to selectively close the flow passage thereof upon uncoupling of said parts.

11. A breakaway fluid coupling characterized by its ability to operate under misalignment conditions, comprising, in combination, male and female coupling parts each defining a fluid passage having an axis and each including conduit system attachment means, an axially extending annular projection defined on said male coupling part defining a portion of said male part passage, an exterior spherical sealing surface concentrically defined on said projection, an inner spherical surface recess defined in said female coupling part sealingly receiving said projection spherical surface permitting pivoting of said coupling parts relative to each other, connectable first and second locking means defined upon said first and second coupling parts, respectively, one of said locking means being shiftable upon its part between locking and release positions, and operating means defined upon one of said parts shifting said one locking means from its locking position to its release position upon the axial misalignment of said coupling parts due to relative pivoting exceeding a predetermined extent, said one locking means comprising an annular axially biased sleeve slidably mounted upon said female coupling part, said operating means including an axially displaceable annular ring defined on said male part concentric with the axis thereof and a fixed abutment annular shoulder defined on said male coupling part concentric with the axis thereof engagable with said sleeve upon a predetermined angular displacement occuring between said male and female coupling parts.

* * * * *

UNITED STATES PATENT OFFICE
CERTIFICATE OF CORRECTION

Patent No. 4,269,226      Dated May 26, 1981

Inventor(s) Alan R. Allread

It is certified that error appears in the above-identified patent and that said Letters Patent are hereby corrected as shown below:

Column 6, line 10, delete "their associated part" and substitute -- one of said parts --;
line 12, delete "the other" and substitute -- one --;
line 13, delete "one", first occurrence and substitute -- the other --

Signed and Sealed this

Twenty-fifth Day of August 1981

[SEAL]

Attest:

GERALD J. MOSSINGHOFF

Attesting Officer      Commissioner of Patents and Trademarks